United States Patent [19]

Yotsumoto et al.

[11] Patent Number: 4,596,854

[45] Date of Patent: Jun. 24, 1986

[54] ADHESIVE FOR ADHERING A POLYESTER FIBROUS MATERIAL TO RUBBER

[75] Inventors: Toshihiro Yotsumoto, Higashimurayama; Tsuneharu Akiyama, Akishima, both of Japan

[73] Assignee: Bridgestone Corp., Tokyo, Japan

[21] Appl. No.: 655,829

[22] Filed: Oct. 1, 1984

[30] Foreign Application Priority Data

Sep. 30, 1983 [JP] Japan .............................. 58-180388

[51] Int. Cl.$^4$ ............................................. C08L 81/04
[52] U.S. Cl. ................................... 525/133; 156/110.1; 156/335; 525/138; 525/139; 525/505
[58] Field of Search ............... 525/505, 139, 138, 133, 525/534; 524/510; 156/335

[56] References Cited

U.S. PATENT DOCUMENTS

| | | | |
|---|---|---|---|
| 3,455,851 | 7/1969 | Meredith et al. | 525/138 |
| 3,705,868 | 12/1972 | Honda et al. | 524/332 |
| 4,361,677 | 11/1982 | Furukawa et al. | 525/139 |

Primary Examiner—Theodore E. Pertilla
Attorney, Agent, or Firm—Sughrue, Mion, Zinn, Macpeak & Seas

[57] ABSTRACT

An adhesive for adhering fibrous materials, particularly polyester fibrous material to rubber is disclosed, which comprises polyhydric phenol-polysulfides, resorcin excess resorcin-formaldehyde condensates, and RFL solution composed of resorcin-formaldehyde condensate and rubber latex.

2 Claims, 1 Drawing Figure

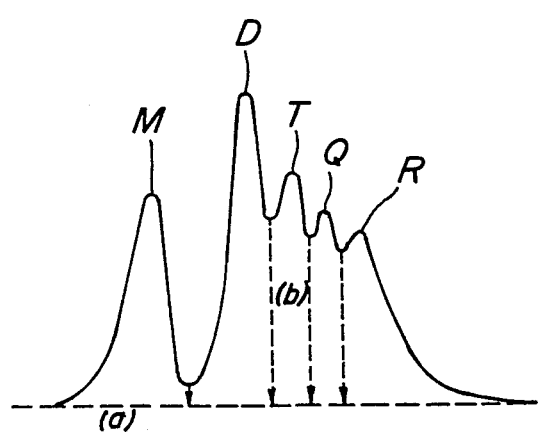

ADHESIVE FOR ADHERING A POLYESTER FIBROUS MATERIAL TO RUBBER

BACKGROUND OF THE INVENTION

1. Field of the Invention

The present invention relates to an adhesive for fibrous materials, and more particularly to an adhesive which well adheres a polyester fibrous material to rubber and reduces a deterioration of adhesion even under a high-temperature using condition and a deterioration of strength of the polyester fibrous material.

2. Description of the Prior Art

Polyester materials typified by polyethylene terephthalate, which are a linear micromolecule having ester linkage in its main chain, retain stable properties and are less in the stress mitigation and have excellent creep characteristics and excellent stretch elastic recovery and the like as compared with nylon material or the like, so that they are very useful as a reinforcing material for rubber articles such as tire, belt, air spring, rubber hose and the like in the form of filament, yarn, cord, cable cord fabric, canvas or the like.

However, these rubber articles are generally used under a high strain and a high temperature, so that a heat particularly generated under the high strain and a surrounding heat cause a deterioration in the strength of the polyester fibrous material and a deterioration in the adhesion to rubber articles.

Recently, with the advancement of motorization, fibrous reinforcing rubber articles such as tire and the like have required a weight saving of the article itself. For this purpose, the thinning and weight saving of the article have been effected by using reinforcement materials having a thick diameter and a high strength. However, this tends to cause more heat build-up of the rubber article because the higher loading and stress are applied to each of the reinforcement materials. Moreover, large-size tires requiring a high level of durability have a trend to make the thickness of the tread portion thicker, which is required to use a polyester fibrous material having an excellent heat resistance.

An adhesive for rubber consisting mainly of a solution of polyhydric phenol-polysulfide dissolved in resorcin-formaldehyde condensate containing an excess amount of resorcin (hereinafter abridged as resorcin excess resorcin-formaldehyde condensate) has been proposed (see U.S. Pat. No. 3,705,868), which has got some good results but is particularly poor in the heat aging characteristics, and thus could not meet a recent requirement for increasing the durability in rubber articles.

SUMMARY OF THE INVENTION

The inventors have made various investigations in order to solve the above problems of the prior art and as a result the invention has been accomplished. It is, therefore, an object of the invention to reduce the deterioration in the strength of the polyester fibrous material as well as the deterioration in the adhesion of the polyester fibrous material to the rubber article to thereby improve performances of the polyester fibrous material under a high stress and a high temperature.

That is, an object of the invention is to provide an adhesive which improves heat-resistant properties of the polyester fibrous material.

According to the invention, there is the provision of an adhesive for fibrous materials, particularly polyester fibrous material, which comprises:

(a) component (A) composed of polyhydric phenol-polysulfides having the following general formula:

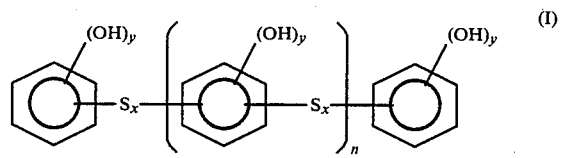

, wherein x is an integer of 1 to 8, y is 2 or 3 and n is 0 or an integer of 1 to 15, in which the polysulfide having the number of polyhydric phenols linked through $S_x$ of not less than 4 is not more than 30%;

(b) component (B) composed of resorcin excess resorcin-formaldehyde condensates, which are synthesized at a reaction molar ratio of resorcin to formaldehyde within a range of 1.0:0.1 to 1.0:0.75 in the absence or the presence of a weak acidic catalyst, in which the condensate having the number of resorcins linked through formaldehyde of not less than 5 is not more than 35%; and (c) RFL solution consisting of a resorcin type resorcin-formaldehyde condensate, which is synthesized in the presence of an alkali catalyst at a reaction molar ratio of resorcin to formaldehyde within a range of 1:1–1:7, and rubber latex at a weight ratio of both solid contents of 1:100–35:100; and (d) said components (A)–(C) are mixed so that the weight ratio of solid contents of the components (A) and (B) is (A):(B)=10:100–50:100 and the content of monomer in mixing (A) with (B) is not more than 20% and the mixing ratio is [(A)+(B)]:(C)=1:0.5–1:2.

In this case, polyester fibers are obtained by condensing glycols, such as ethylene glycol, propylene glycol, methoxy-polyethylene glycol, pentaerythritol, etc., with dicarboxylic acids or dicarboxylates, such as terephthalic acid, isophthalic acid, dimethyl terephthalate, dimethyl isophthalate, etc., through esterification reaction or ester interchange reaction into a high degree of polymerization. The most typical fiber is polyethylene terephthalate fiber.

BRIEF DESCRIPTION OF THE DRAWING

A single FIGURE is a GPC chart with respect to the components in the adhesive according to the invention.

BRIEF DESCRIPTION OF THE PREFERRED EMBODIMENTS

Then, an explanation will be made with respect to an adhesive for polyester fibrous materials to be used in the invention.

(1) The component (A) of the formula (I) is resorcins linked through sulfur atoms $S_x$ (x=1–8), in which the resorcin having the number of polyhydric phenols linked of not less then 4 is not more than 30%. When such resorcin exceeds 30%, the diffusivity to polyester unfavorably decreases. The component (B) if RF novolak resins, in which the resin having the number of resorcins linked through —$CH_2$— (methylene) residues of the formaldehyde reaction of not less than 5 is not more than 35%. When such a resin exceeds 35%, the diffusivity to polyester undesirably decreases.

(2) According to the invention, the content of polymer in the component (A) or (B) is defined as follows. That is, the polymer content was measured by means of GPC (gel permeation chromatography), wherein 0.1 g of a sample is dissolved into 10 ml of T.H.F. and passed through a column G2000H (10×1) including T.H.F. as a mobile phase at the room temperature under a flow rate of 1 ml/min to measure a pattern of molecular weight distribution by means of an R1 detector.

The resulting GPC chart is shown in the single FIGURE, from which the polymer content is determined as follows:

(i) Several peaks of the resulting GPC waveform are regarded from the lower molecular weight side to higher as monomer M, dimer D, trimer T, tetramer Q and pentamer or more R.

(ii) The foot of the low molecular weight side and that of the high molecular weight side are connected by a line being a base line (a).

(iii) A perpendicular line (b) is drawn from a valley (the lowest part) between the peaks of the waveform each showing the molcular weight of the polymer with respect to the base line. This line is a boundary between the adjoining polymers having different molecular weights.

(iv) An area of chart showing the each polymer is represented as a percentage based on total area (whole area of GPC waveform laid on the base line), which shows the content of each polymer.

(3) The synthesis of the components (A) and (B) will be described below. The component (A) having the polymer content as defined in the invention is obtained by reacting sulfur chloride with resorcin in a solvent inert for sulfur chloride, such as toluene or the like, at a weight ratio of sulfur chloride to resorcin within a range of 1:0.3–0.7 under a relatively mild reaction temperature condition of not more than 80° C.

On the other hand, the component (B) having the polymer content as defined in the invention is obtained by dissolving resorcin in water and then reacting it with formaldehyde in the absence or the presence of a weak acidic catalyst, such as oxalic acid or the like, at a weight ratio of resorcin to formaldehyde within a range of 1:0.1–0.75 under a relatively mild reaction temperature condition of not more than 70° C.

The component (C) of RFL solution to be used in the invention is prepared by reacting and aging resorcin with formaldehyde at a reaction molar ratio of 1:1–1:7 in the presence of an alkali catalyst (for example, sodium hydroxide, potassium hydroxide, ammonium hydroxide, urea, thiourea or the like), mixing with rubber latex at a weight ratio of 1:100–35:100 and further aging them for several hours, or may be prepared by mixing and aging resorcin, formaldehyde and rubber latex at the above ratios in one step. The amount of the alkali catalyst added is adjusted so taht a value of pH of RFL after aged is 8.5–12.0.

Particularly, the preferred catalyst is ammonium hydroxide. In this case, it is better to mix and age the resorcin, formaldehyde and rubber latex in one step.

As the rubber latex used in RFL, use may be made of natural rubber latex, or at least one synthetic rubber latex such as styrene-butadiene copolymer rubber latex, styrene-vinyl pyridine-butadiene copolymer rubber latex and the like. In general, the kind of rubber latex is determined depending upon the kind of rubber to be adhered.

Preferably, the component (A) is mixed with the component (B) at a weight ratio of (A):(B) of 10:100–50:100. When such ratio is too high or low, the adhesive force decreases.

The mixing ratio of the mixture of component (A) and component (B) to RFL (C) is preferably within a range of 1:0.5–1:2 as a weight ratio. When the ratio is too high, the adhesive force decreases, while when the ratio is too low, the bonding force to the fiber decreases and thus polyester having a high adhesivity for reinforcing rubber cannot be obtained.

(4) Then an explanation will be made with respect to a process for preparing the polyester fibrous material for reinforcing rubber according to the invention.

First of all, the polyester fibrous material is processed by using the adhesive according the invention. As the application of the adhesive to the fibrous material, there are a method in which the fibrous material is immersed in the adhesive liquid, a method in which the adhesive liquid is applied with a doctor knife or the like, a method in which the adhesive liquid is splayed, and the like. Among them, the suitable method may be selected depending upon the situation. Then, the fibrous material coated with the adhesive liquid is subjected to a heat treatment. This heat-treatment may be carried out at a temperature of at least 200° C., preferably 220° C.–250° C.

Because, the adhesive components according to the invention are diffused into the polyester fiber to develop the adhesive force, so that the better results are obtained as the temperature of the heat treatment becomes higher. Particularly, when the temperature is lower than 200° C., the diffusivity is very poor. While, when the temperature exceeds 250° C., the degradation of properties of the polyester fiber, particularly the deterioration of the strength is unfavorably caused.

By the above process, the polyester fibrous material for reinforcing rubber using the adhesive according to the invention can be obtained.

(5) The term "rubber" used herein means to include all natural rubbers and synthetic rubbers, which are usually referred to as rubbery elastic polymer. Particularly, it means a rubber selected from general-purpose rubbers, such as natural rubber, styrene-butadiene copolymer rubber, polybutadiene rubber, polyisoprene rubber, isoprene-isobutylene copolymer rubber, polychloroprene rubber and the like or compositions of blends of two or more of these rubbers.

The adhesive for polyester fibrous materials according to the invention more securely adheres to rubber, is excellent in the resistance to degradation of heat adhesion, and causes little deterioration of strength of the polyester fibrous material as compared with that of the prior art, so that the polyester fibrous material for reinforcing rubber, using this adhesive is very useful in industry.

The invention will be described in greater detail with reference to the following examples.

EXAMPLE 1

(1) As the polyester fibrous material was used a cord having a twist structure of 1,500 d/2 obtained by twisting polyester filament yarns of 1,500 d at a ply twist of 40 turns/10 cm and a cable twist of 40 turns/10 cm.

(2) In a flask, 110 parts of resorcin was dissolved in 500 parts of toluene and then 35 parts of sulfur monochloride was added dropwise thereto over 3 hours at 25° C. with stirring, and thereafter the resulting mixture was left to stand for 24 hours. Then, toluene was removed under a reduced pressure to obtain viscous resorcin-polysulfide (A). The measurement through GPC showed that the content of tetramer or more was 27.5%.

(3) 110 parts of resorcin, 0.62 part of oxalic acid and 248 parts of water were charged into a flask and 50 parts of 37% formalin solution was added dropwise thereto at 60° C. over a hour with stirring, and the stirring was further continued for one hour to obtain resorcin excess resorcin-formaldehyde condensates (B). The measurement through GPC showed that the content of pentamer or more was 31.2%.

(4) The resorcin-polysulfides (A) were mixed with the resorcin excess resorcin-formaldehyde condensates (B) at a ratio of solid content of 20:100. When the resulting mixture was measured through GPC, the content of monomer was 10.8%. Then, 18 parts of solid content was taken out from the mixture and added with 9 parts of 28% ammonia water, and further water was added so that the whole was 50 parts, whereby the solid content was completely dissolved in water. Then, the resulting solution was added with 50 parts of RFL to provide an adhesive liquid.

The above RFL having the following composition was prepared and aged for more than 49 hours.

|  | Parts |
| --- | --- |
| Water | 518.8 |
| Resorcin | 11.0 |
| Formalin (37%) | 16.2 |
| Ammonium hydroxide (28%) | 10.0 |
| Vinylpyridine-styrene-butadiene copolymer rubber latex (41%) | 244.0 |

(5) Then, the polyester fibrous material was immersed into the adhesive liquid by means of a compu-treater made by Rittular Co., and then passed through a drying oven at 160° C. for 60 minutes into a heat treating oven at 240° C. for 120 minutes to obtain an adhesive processed polyester fibrous material. This material was tested to obtain results as shown in the following Table 1.

(6) Test Method (a) Thermal stability of cord

A rubberized cord fabric containing the adhesive-processed cords arranged at an end count of 50 cords/5 cm and up and down rubbers of 0.5 mm in thickness was made and cut at 60 cm in length and 5 cm in width. The thus cut cord fabric was provided with rubbers having a thickness of 5 cm on both the surfaces, and vulcanized at 145° C. for 30 minutes under a pressure of 20 kg/cm$^2$ to obtain a sample.

The sample was aged at 120° C. for 5 days in N$_2$ atmosphere, and thereafter the pulling strength of the cord from the sample was measured by means of a tensilometer. The resulting value was represented by an index on a basis that a value of Comparative Example 1 was 100.

(b) Initial adhesive force

The adhesive-processed cords were embedded in an unvulcanized rubber composition and then vulcanized at 145° C. for 30 minutes under a pressure of 20 kg/cm$^2$. Thereafter, the cord was peeled off from the vulcani-zate at a rate of 30 cm/min to measure a peeling strength as an adhesive force (kg/cord).

(c) Heat-resistant adhesive force

The same sample as used in the measurement of the initial adhesive force was used and aged in an oven at 120° C. under N$_2$ atmosphere for 5 days, and after cooling, the adhesive force was measured in the same manner as described in the measurement of the initial adhesive force. The result was represented by an index on a basis that a value of Comparative Example 1 is 100.

(d) The rubber composition used for the adhesion test had the following compounding recipe.

|  | Parts by weight |
| --- | --- |
| Natural rubber | 80 |
| Styrene-butadiene copolymer rubber | 20 |
| Carbon black | 40 |
| Stearic acid | 2 |
| Petroleum series softener | 10 |
| Pine tar | 4 |
| Zinc white | 5 |
| N—phenyl-β-naphthylamine | 1.5 |
| 2-benzothiazolyl disulfide | 0.75 |
| Diphenyl guanidine | 0.75 |
| Sulfur | 2.5 |

The above rubber composition was used in the measurement of the items (a)-(c).

COMPARATIVE EXAMPLE 1

(1) As the polyester fibrous material was used a cord having a twist structure of 1,500 d/2 obtained by twisting polyester filament yarns of 1,500 d at a ply twist of 40 turns/10 cm and a cable twist of 40 turns/cm.

(2) In a flask, 55 parts of resorcin was dissolved in 500 parts of ethyl ether and 35 parts of sulfur monochloride was added dropwise thereto over 3 hours at 25° C. with stirring. Then, the resulting mixture was left to stand for 24 hours and ethyl ether was removed therefrom under a reduced pressure to obtain viscous resorcin-polysulfides (A). The measurement through GPC showed that the content of tetramer or more was 32.6%.

(3) 160 parts of resorcin was fused by heating at 120° C. in a flask, and 45 parts of 37% formalin solution was added dropwise over 20 minutes under reflux cooling with stirring, and further the reaction was continued for 20 minutes to obtain resorcin excess resorcin-formaldehyde condensates (B). The measurement through GPC showed that the content of pentamer or more was 38.7%.

(4) The resorcin-polysulfides (A) were mixed with the resorcin excess resorcin-formaldehyde condensates (B) at a ratio of solid content of 15:85. As a result of the measurement through GPC, the content of monomer was 10.2%. From the resulting mixture, 18 parts of solid content was taken out and 9 parts of 28% ammonia water was added thereto, and further water was added so that the whole was 50 parts, whereby the solid content was completely dissolved in water. Then, 50 parts of RFL was added thereto to obtain an adhesive liquid.

Thereafter, the same process and estimation as described in Example 1 were repeated to obtain results shown in Table 1.

COMPARATIVE EXAMPLE 2

The same process and estimation as described in Example 1 were repeated, except that the resorcin-polysulfides (A) obtained in Comparative Example 1 were mixed with the resorcin-formaldehyde condensates (B) obtained in Example 1 at a ratio of solid content of 20:100. Moreover, the measurement through GPC showed that the content of monomer was 10.4%.

The results are shown in Table 1.

COMPARATIVE EXAMPLE 3

The same process and estimation as described in Example 1 were repeated, except that the resorcin-polysulfides (A) obtained in Example 1 were mixed with the resorcin-formaldehyde condensates (B) obtained in Comparative Example 1 at a ratio of solid content of 20:100. Moreover, the measurement through GPC showed that the content of monomer was 12.4%. The results are shown in Table 1.

COMPARATIVE EXAMPLE 4

The same process and estimation as described in Example 1 were repeated using the polyester fibrous material described in Example 1 except for the following:

To the composition of resorcin-polysulfides (A) and resorcin excess resorcin-formaldehyde condensates (B) having the ratio of solid content of 15:85 was added resorcin so as to increase the monomer in the composition. In the resulting composition, the content of monomer of 21.3% was shown by the measurement through GPC. From this composition, 18 parts of solid content was taken out and 9 parts of 28% ammonia water was added thereto, and further water was added so that the whole was 50 parts, whereby the solid content was completely dissolved. Then, 50 parts of RFL was added to obtain an adhesive liquid.

The results are shown in Table 1.

TABLE 1

|  | Example 1 | Comparative Example 1 | Comparative Example 2 | Comparative Example 3 | Comparative Example 4 |
|---|---|---|---|---|---|
| Resorcin-polysulfides (A) Content of tetramer or more (%) | 27.5 | ← | 32.6 | 27.5 | 25.6 |
| Resorcin-formaldehyde condensates (B) Content of pentamer or more (%) | 31.2 | 38.7 | 31.2 | 38.7 | 30.4 |
| Monomer content in components (A) + (B) (%) (Resorcin) | 10.8 | 10.2 | 10.4 | 12.4 | 21.3 |
| Initial adhesive force (kg/cord) | 2.52 | 2.30 | 2.20 | 2.32 | 2.10 |
| Heat-resistant adhesive force (Index) | 130 | 100 | 110 | 115 | 45 |
| Thermal stability of cord (Index) | 120 | 100 | 99 | 105 | 87 |

EXAMPLES 2-4, COMPARATIVE EXAMPLES 5, 6

The same process and estimation as described in Example 1 were repeated, except that an adhesive liquid was used by varying the ratio of the solid content of the resorcin-polysulfides (A) to the resorcin excess resorcin-formaldehyde condensates (B) from that in Example 1. The results are shown in the following Table 2.

TABLE 2

|  | Example 2 | Example 3 | Example 4 | Comparative Example 5 | Comparative Example 6 |
|---|---|---|---|---|---|
| (A):(B) | 10:100 | 30:100 | 50:100 | 5:100 | 60:100 |
| Initial adhesive force (kg/cord) | 2.50 | 2.52 | 2.52 | 2.30 | 2.30 |

TABLE 2-continued

|  | Example 2 | Example 3 | Example 4 | Comparative Example 5 | Comparative Example 6 |
|---|---|---|---|---|---|
| Heat-resistant adhesive force (Index) | 125 | 130 | ← | 100 | 101 |
| Thermal stability of cord (Index) | 120 | ← | 115 | 102 | 100 |

EXAMPLES 5-7, COMPARATIVE EXAMPLES 7, 8

The same process and estimation as described in Example 1 were repeated, except that an adhesive liquid was used by varying the ratio of solid content of the adhesive components to RFL from that in Example 1. The results are shown in the following Table 3.

TABLE 3

|  | Example 5 | Example 6 | Example 7 | Comparative Example 7 | Comparative Example 8 |
|---|---|---|---|---|---|
| [(A) + (B)]:C | 1:0.5 | 1:1.5 | 1:2 | 1:0.25 | 1:2.5 |
| Initial adhesive force (kg/cord) | 2.50 | 2.52 | 2.50 | 2.28 | 2.30 |
| Heat-resistant adhesive force (Index) | 130 | ← | 120 | 100 | 102 |
| Thermal stability of cord (Index) | 118 | 120 | 120 | 100 | 101 |

What is claimed is:

1. An adhesive for adhering a polyester fibrous material to rubber, which comprises:

(a) component (A) composed of polyhydric phenolpolysulfides having the following general formula:

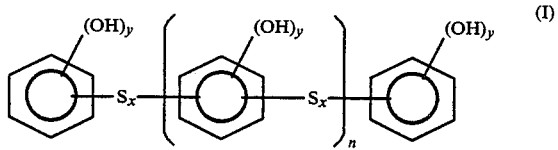

wherein x is an integer of 1 to 8, y is 2 or 3 and n is 0 or an integer 1 to 15, in which the polysulfide having the number of polyhydric phenols linked through $S_x$ of not less than 4 is not more than 30%;

(b) component (B) composed of resorcin excess resorcin-formaldehyde condensates, which are synthesized at a reaction molar ratio of resorcin to formaldehyde within a range of 1.0:0.1 to 1.0:0.75 in the absence of an acidic catalyst, in which the condensate having the number of resorcins linked through formaldehydes of not less than 5 is not more than 35%;

(c) component (C), RFL solution consisting of a resorcin type resorcin-formaldehyde condensate, which is synthesized in the presence of an alkali catalyst at a reaction molar ratio of resorcin to formaldehyde within a range of 1:1–1:7, and rubber latex at a weight ratio of both solid contents of 1:100 –35:100; and (d) said components (A)–(C) are mixed so that the weight ratio of solid contents of the components (A) and (B) is (A):(B)=10:100–50:100 and the content of monomer in mixing (A) with (B) is not more than 20% and the mixing ratio is [(A)+(B)]:(C)=1:0.5–1:2.

2. An adhesive for adhering a polyester fibrous material to rubber, which comprises:

(a) component (A) composed of polydydric phenol-polysulfides having the following general formula:

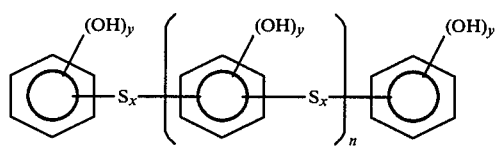

wherein x is an integer of 1 to 8, y is 2 or 3 and n is 0 or an integer 1 to 15, in which the polysulfide having the number of polyhydric phenols linked through $S_x$ of not less than 4 is not more than 30%.

(b) component (B) composed of resorcin excess resorcin-formaldehyde condensates, which are synthesized at a reaction molar ratio of resorcin to formaldehyde within a range of 1.0:0.1 to 1.0:0.75 in the presence of a weak acidic catalyst, in which the condensate having the number of resorcins linked through formaldehydes of not less than 5 is not more than 35%; and (c) component (C), RFL solution consisting of a resorcin type resorcin-formaldehyde condensate, which is synthesized in the presence of an alkali catalyst at a reaction molar ratio of resorcin to formaldehyde within a range of 1:1–1:7, and rubber latex at a weight ratio of both solid contents of 1:100–35:100; and (d) said components (A)–(C) are mixed so that the weight ratio of solid contents of the components (A) and (B) is (A):(B)=10:100–50:100 and the content of monomer in mixing (A) with (B) is not more than 20% and the mixing ratio is [(A)+(B)]:(C)=1:0.5–1:2.

* * * * *